United States Patent
Norp et al.

(10) Patent No.: US 11,259,182 B2
(45) Date of Patent: Feb. 22, 2022

(54) SYSTEM AND METHODS OF SENDING AND RECEIVING A RELAY NOTIFICATION

(71) Applicants: Koninklijke KPN N.V., Rotterdam (NL); Nederlandse Organisatie voor Toegepast-Natuurwetenschappelijk Onderzoek TNO, s-Gravenhage (NL)

(72) Inventors: Antonius Norp, The Hague (NL); Miodrag Djurica, Rotterdam (NL); Sander de Kievit, Tokyo (JP); Daphne Creusen, Rotterdam (NL)

(73) Assignees: Koninklijke KPN N.V., Rotterdam (NL); Nederlandse Organisatie Voor Toegepast-Natuurwetenschappelijk Onderzoek TNO, 'S-Gravenhage (NL)

( * ) Notice: Subject to any disclaimer, the term of this patent is extended or adjusted under 35 U.S.C. 154(b) by 0 days.

(21) Appl. No.: 16/326,677

(22) PCT Filed: Aug. 28, 2017

(86) PCT No.: PCT/EP2017/071501
§ 371 (c)(1),
(2) Date: Feb. 19, 2019

(87) PCT Pub. No.: WO2018/041757
PCT Pub. Date: Mar. 8, 2018

(65) Prior Publication Data
US 2019/0191356 A1    Jun. 20, 2019

(30) Foreign Application Priority Data

Aug. 29, 2016   (EP) ..................................... 16186114
Aug. 29, 2016   (EP) ..................................... 16186118

(51) Int. Cl.
*H04W 12/086*   (2021.01)
*H04W 88/04*    (2009.01)
(Continued)

(52) U.S. Cl.
CPC ......... *H04W 12/086* (2021.01); *H04M 11/00* (2013.01); *H04W 12/66* (2021.01);
(Continued)

(58) Field of Classification Search
CPC ..... H04W 40/22; H04W 12/08; H04W 88/04; H04W 68/025
See application file for complete search history.

(56) References Cited

U.S. PATENT DOCUMENTS

| | | |
|---|---|---|
| 2011/0283001 A1 | 11/2011 | Jung et al. |
| 2012/0264375 A1 | 10/2012 | Shankaranarayanan |

(Continued)

FOREIGN PATENT DOCUMENTS

| | | |
|---|---|---|
| CN | 101389116 | 3/2009 |
| CN | 101742623 A | 6/2010 |

(Continued)

OTHER PUBLICATIONS

European Patent Office, Extended European Search Report for EP Pat. App. No 16186118.2, dated Mar. 14, 2017.

(Continued)

*Primary Examiner* — Mohammad S Anwar
(74) *Attorney, Agent, or Firm* — McDonnell Boehnen Hulbert & Berghoff LLP

(57) ABSTRACT

A system for sending a relay notification comprises a transceiver and a processor. The processor is configured to use the transceiver to receive a request for allowing a mobile device to be used by a further mobile device as a relay to a mobile communication network. The processor is further configured to determine whether the mobile device is to act as a relay for the further mobile device based on the unique identifier of the further mobile device, and to use the transceiver to notify the mobile device that it is to act as a relay for the further mobile device in dependence on the (Continued)

determination. The mobile device is configured to receive the notification from the system. The processor is further configured to start relaying data received from the further mobile device to the mobile communication network upon receiving the notification.

14 Claims, 7 Drawing Sheets

(51) Int. Cl.
| | |
|---|---|
| *H04M 11/00* | (2006.01) |
| *H04W 12/60* | (2021.01) |
| *H04W 12/75* | (2021.01) |
| *H04W 76/11* | (2018.01) |
| *H04W 40/22* | (2009.01) |
| *H04W 68/02* | (2009.01) |
| *H04W 76/16* | (2018.01) |

(52) U.S. Cl.
CPC ........... *H04W 12/75* (2021.01); *H04W 40/22* (2013.01); *H04W 68/025* (2013.01); *H04W 76/11* (2018.02); *H04W 88/04* (2013.01); *H04W 76/16* (2018.02)

(56) References Cited

U.S. PATENT DOCUMENTS

| | | |
|---|---|---|
| 2013/0294327 A1 | 11/2013 | Horn et al. |
| 2014/0254499 A1 | 9/2014 | Hassan et al. |
| 2015/0009908 A1 | 1/2015 | Kalapatapu et al. |
| 2016/0036514 A1 | 2/2016 | Saida |
| 2016/0088468 A1* | 3/2016 | Sharma .................. H04W 4/24 370/329 |

FOREIGN PATENT DOCUMENTS

| | | | |
|---|---|---|---|
| CN | 102090106 A | 6/2011 | |
| CN | 104756417 A | 7/2015 | |
| CN | 105263152 A | 1/2016 | |
| EP | 2863705 B1 | 4/2017 | |
| WO | WO 2017/082955 A1 * | 4/2016 | .............. H04W 8/02 |

OTHER PUBLICATIONS

International Searching Authority, International Search Report and Written Opinion for PCT Pat. App. No. PCT/EP2017/071501, dated Nov. 27, 2017.

Chinese Office Action in Chinese Patent Application No. 201780066602.9 dated Jul. 2, 2020.

* cited by examiner

SYSTEM AND METHODS OF SENDING AND RECEIVING A RELAY NOTIFICATION

CROSS REFERENCE TO RELATED APPLICATIONS

This application is a national stage entry of, and claims priority to, PCT Pat. App. No. PCT/EP2017/071501, filed Aug. 28, 2017, which claims priority to European Pat. App. No. 16186114.1, filed Aug. 29, 2016 and claims priority to European Pat. App. No. 16186118.2, filed Aug. 29, 2016, all of which are fully incorporated herein by reference for all purposes.

FIELD OF THE INVENTION

The invention relates to a system for sending a relay notification and a mobile device.

The invention further relates to a method of sending a relay notification and a method of receiving a relay notification.

The invention also relates to a computer program product enabling a computer system to perform any of such methods.

BACKGROUND OF THE INVENTION

The amount of devices that is able to connect to the Internet is expected to grow enormously, especially as a result of everyday objects having network connectivity. Not only do users communicate via Internet-connected devices, but devices also send data, e.g. sensor data or maps, to other devices (machine-to-machine communication) over the Internet. It is estimated that by the year 2020 50 billion devices will be connected. Therefore, it is no surprise that industry efforts and investments are directed towards this field. The category of mobile devices, e.g. mobile phones, tablets, wearable devices and devices embedded in vehicles, is an important category of devices that is able to connect to the Internet. In order to reduce power consumption, it is advantageous to tether certain devices, e.g. wearable devices, to other devices, e.g. smart phones.

US2015/0009908 discloses a communication device configured to relay communications between one or more out-of-coverage communication devices and a base station using one or more Proximity Services (ProSe). When this communication device is configured to offer Proximity Services, any other communication device is able to use these services.

EP 2 863 705 A1 discloses a method in which a first device connected to an external network, e.g. an 3G or LTE network, acts as an Access Point towards a second device in order to relay data from the second device to the external network via the first device. A connection request sent by the second device to the first device may identify designated passwords, identification information, security information, authentication information, etc.

A drawback of the prior art devices is that the owner of the first device that is to act as a relay may not want to relay for everyone at any time, but may also not want to share a password with others. The latter is disadvantageous in cases that the owner of the first device would like to allow a friend to use his/her device as a relay just for a short period of time or for a specific purpose. If the owner would opt to provide the password, namely, the owner would have to change the password afterwards to deny access again. Other options would be that the owner sets up a new access point for the friend to connect to and then removes this access point again from its configuration.

In the prior art disclosed in US2015/0009908, the owner of the first device would not have any means to provide access control. Namely, once the first device is configured to act as a relay, it will not distinguish between a second, a third, etc. device. Other prior art devices, e.g. Bluetooth devices, require that the owner accepts or declines connections based on identification information sent by a second device that wants to use the first device as a relay. This also has drawbacks, because this identification information is not always reliable. For example, the user of the first device does not know whether a second device named "Sam's phone" is actually owned or used by Sam. Solutions from the prior art therefore lack flexibility for the owner of the first device to apply access control and assurance for the identification of the second device.

SUMMARY OF THE INVENTION

It is a first object of the invention to provide a system for sending a relay notification, which helps make a better decision as to whether a mobile device should relay data received from a further mobile device to a mobile communication network.

It is a second object of the invention to provide a mobile device, which helps make a better decision as to whether the mobile device should relay data received from a further mobile device to a mobile communication network.

It is a third object of the invention to provide a method of sending a relay notification, which helps make a better decision as to whether a mobile device should relay data received from a further mobile device to a mobile communication network.

It is a fourth object of the invention to provide a method of receiving a relay notification, which helps make a better decision as to whether a mobile device should relay data received from a further mobile device to a mobile communication network.

According to the invention, the first object is realized in that the system for sending a relay notification comprises a receiver, a transmitter and at least one processor configured to use said receiver to receive a request for allowing a mobile device to be used by a further mobile device as a relay to a mobile communication network, to determine a unique identifier of said further mobile device based on said request, to determine whether said mobile device is to act as a relay for said further mobile device based on said unique identifier of said further mobile device, and to use said transmitter to notify said mobile device that it is to act as a relay for said further mobile device in dependence on said determination.

The inventors have recognized that by deciding in the mobile communication network whether a mobile device should act as a relay for a further mobile device to the mobile communication network and notifying the mobile device of this decision, the mobile communication network may be able to use one or more verified identifiers of the further mobile device, meaningful to a person or not, available in or to the mobile communication network, to make a better decision as to whether the mobile device should relay data received from the further mobile device to the mobile communication network. Not only does the user of the mobile device not need to rely on information provided by the user of the further mobile device in order to make a decision, the user of the mobile device does not have to make a decision himself.

Said unique identifier may comprise a permanent identifier of said mobile device identifying said mobile device in said mobile communication network and/or a temporary identifier of said mobile device identifying said mobile device in said mobile communication network. Said temporary identifier may be specific to a certain service in said mobile communication network. Said unique identifier may comprise an International Mobile Subscriber Identity (IMSI), a Globally Unique Temporary User Equipment Identity (GUTI), a Proximity Services (ProSe) (obfuscated) identifier, and/or a C-RNTI.

Said at least one processor may be further configured to determine a unique identifier of said mobile device based on said request and to determine a relation between said mobile device and said further mobile device based on said unique identifier of said mobile device and said unique identifier of said further mobile device and said at least one processor may be configured to determine whether said mobile device is to act as a relay for said further mobile device based on said relation. For example, the at least one processor may determine that the mobile device should act as a relay when the subscriptions of both mobile devices are paid by the same company or organization.

Said at least one processor may be further configured to obtain information relating to said further mobile device based on said unique identifier of said further mobile device and said at least one processor may be further configured to determine whether said mobile device is to act as a relay for said further mobile device based on said information relating to said further mobile device. For example, the at least one processor may determine that the mobile device should act as a relay when a mobile phone number or social media username of the further mobile device is in a contact list associated with (a subscription of) the mobile device.

Said information relating to said further mobile device may comprise an e-mail address, an MSISDN, a Session Initiation Protocol Uniform Resource Identifier, a social network username or profile picture and/or an indication of an existing relation between said mobile device and said further mobile device.

Said at least one processor may be configured to obtain said information from a database in said mobile communication network and/or from a trusted third party server. The database in the mobile communication network may map IMSIs to e-mail addresses or IMSIs to organizations, for example. The trusted third party server may be a server of a company like Facebook, Google or Microsoft, for example. The trusted third party server may be under control of the third party, but run on a device owned by another party, e.g. the mobile communication network operator. The trusted third party server and other functions, e.g. functions of the mobile communication network, may run on the same device. The trusted third party server may be located close to the edge of the mobile communication network, for example. The third party may place servers close to the edge of each of a plurality of mobile communication networks to increase performance, for example.

Said at least one processor may be configured to obtain information relating to said further mobile device based on said unique identifier of said further mobile device, to determine a unique identifier of said mobile device based on said request, to obtain information relating to said mobile device based on said unique identifier of said mobile device, to determine a relation between said mobile device and said further mobile device based on said information relating to said mobile device and on said information relating to said further mobile device, and to determine whether said mobile device is to act as a relay for said further mobile device based on said relation. For example, the at least one processor may determine that the mobile device should act as a relay when the users of both mobile devices are friends on Facebook or connections on Linked-In.

Said at least one processor may be further configured to determine whether data use can be charged to said further mobile device based on said unique identifier of said further mobile device and said at least one processor may be configured to determine whether said mobile device is to act as a relay for said further mobile device in dependence on whether data use can be charged to said further mobile device. For example, the at least one processor may only determine that the mobile device should act as a relay when data use can be charged to the further mobile device.

Said at least one processor may be configured to implement a 3GPP Proximity Services Function. Advantageously, the said at least one processor can then detect proximity between devices. It can also configure devices to use proximity services and has access to Proximity Service subscription databases in which it is stored which devices can use Proximity Services. Also, when configured to use other internet-based services, such as Facebook, Google+ and LinkedIn lookup these types of identifiers using specified methods.

According to the invention, the second object is realized in that the mobile device comprises a receiver, a transmitter, and at least one processor configured to use said receiver to receive a notification from a system, said notification notifying said mobile device that it is to act as a relay to a mobile communication network comprising said system for said further mobile device, and to use said receiver and said transmitter to start relaying data received from said further mobile device to said mobile communication network, e.g. to an access point or other gateway to said mobile communication network, upon receiving said notification. Said mobile device may be connected with said gateway via a wire or wireless. Said gateway may be an access point such as an NodeB, an eNodeB, a wireless access point, a femtocell, and a picocell, which have in common that transmission of the signal happens by means of an electromagnetic wave such as a radio signal.

According to the invention, the third object is realized in that the method of sending a relay notification comprises the steps of receiving a request for allowing a mobile device to be used by a further mobile device as a relay to a mobile communication network, determining a unique identifier of said further mobile device based on said request, determining whether said mobile device is to act as a relay for said further mobile device based on said unique identifier of said further mobile device, and notifying said mobile device that it is to act as a relay for said further mobile device in dependence on said determination.

According to the invention, the fourth object is realized in that the method of receiving a relay notification comprises the steps of receiving a notification from a system in a mobile communication network on a mobile device, said notification notifying said mobile device that it is to act as a relay to said mobile communication network for a further mobile device, and starting relaying data received from said further mobile device to said mobile communication network, e.g. to an access point or other gateway to said mobile communication network, upon receiving said notification.

In an alternative embodiment, the decision as to whether the mobile device should relay data received from the further mobile device to the mobile communication network may be made by the user of the mobile device.

According to this alternative embodiment, a system is provided for sending information relating to a further mobile device, which helps make a better decision as to whether a mobile device should relay data received from a further mobile device to a mobile communication network.

The system for sending information relating to a further mobile device comprises a receiver, a transmitter, and at least one processor configured to use said receiver to receive a request for allowing a mobile device to be used by a further mobile device as a relay to a mobile communication network, to determine a unique identifier of said further mobile device based on said request, to obtain information relating to said further mobile device based on said unique identifier, and to use said transmitter to send said information to said mobile device. Said information is preferably meaningful to a person.

The inventors have recognized that by translating in the mobile communication network a unique identifier of the further mobile device, e.g. an identifier unique in the mobile communication network, to information relating to the further mobile device, a verified, identifier that is not meaningful to a person, e.g. an International Mobile Subscriber Identity (IMSI), may be translated into verified information that is meaningful to a person. This information is provided to the mobile device so as to allow the user of the mobile device to make a better decision as to whether the mobile device should relay data received from the further mobile device to the mobile communication network without having to rely on information provided by the user of the further mobile device when making this decision.

Said unique identifier may comprise a permanent identifier of said mobile device identifying said mobile device in said mobile communication network and/or a temporary identifier of said mobile device identifying said mobile device in said mobile communication network. Said temporary identifier may be specific to a certain service in said mobile communication network. Said unique identifier may comprise an International Mobile Subscriber Identity (IMSI), a Globally Unique Temporary User Equipment Identity (GUTI), a Proximity Services (ProSe) (obfuscated) identifier, and/or a C-RNTI.

Said information may comprise an e-mail address, an MSISDN, a Session Initiation Protocol Uniform Resource Identifier, a social network username or profile picture and/or an indication of an existing relation between said mobile device and said further mobile device.

Said at least one processor may be configured to determine whether said further mobile device allows said information to be sent to any mobile device, a group of devices which includes said mobile device and/or said mobile device specifically and to only send said information to said mobile device if allowed by said further mobile device. Whether sending said information is allowed may for example follow from a user preference. A user of the further mobile device may value its privacy more than its desire to use the mobile device as a relay to the mobile communication network.

Said at least one processor may be configured to obtain said information relating to said further mobile device from a database in said mobile communication network and/or from a trusted third party server. The database in the mobile communication network may map IMSIs to e-mail addresses or IMSIs to subscribing entities, e.g. companies or organizations, for example. The trusted third party server may be a server of or for a company like Facebook, Google or Microsoft, for example. The trusted third party server may be under control of the third party, but run on a device owned by another party, e.g. the mobile communication network operator. The trusted third party server and other functions, e.g. functions of the mobile communication network, may run on the same device. The trusted third party server may be located close to the edge of the mobile communication network, for example. The third party may place servers close to the edge of each of a plurality of mobile communication networks to increase performance, for example.

Said at least one processor may be configured to implement a 3GPP Proximity Services Function. Advantageously, the said at least one processor can then detect proximity between devices. It can also configure devices to use proximity services and has access to Proximity Service subscription databases in which it is stored which devices can use Proximity Services. Also, when configured to use other internet-based services, such as Facebook, Google+ and LinkedIn lookup these types of identifiers using specified methods.

Said at least one processor may be further configured to determine whether data use can be charged to said further mobile device based on said unique identifier of said further mobile device and to use said transmitter to inform said mobile device that said mobile device is not charged for relaying data from said further mobile device to said mobile communication network if this has been determined to be the case. The mobile device or its user may advantageously take this information into account when making the decision whether to allow relay.

Said at least one processor may be configured to determine a unique identifier of said mobile device based on said request, to determine a relation between said mobile device and said further mobile device based on said unique identifier of said mobile device and said unique identifier of said further mobile device and to use said transmitter to send information comprising an indication of said relation to said mobile device. For example, the relation may comprise the subscriptions of both mobile devices being paid by the same company or organization.

Said at least one processor may be further configured to determine a unique identifier of said mobile device based on said request, to obtain information relating to said mobile device based on said unique identifier of said mobile device, and to determine a relation between said mobile device and said further mobile device based on said information relating to said mobile device and said information relating to said further mobile device and said at least one processor may be configured to use said transmitter to send information comprising an indication of said relation to said mobile device. For example, the relation may comprise that the users of both mobile devices are friends on Facebook or connections on Linked-In.

According to another embodiment, a mobile device is provided which helps make a better decision as to whether the mobile device should relay data received from a further mobile device to a mobile communication network.

The mobile device comprises a receiver, a transmitter, and at least one processor configured to use said receiver to receive information from a system, said information relating to a further mobile device requesting to use said mobile device as a relay to a mobile communication network comprising said system, to determine based on said information whether said mobile device is to act as a relay for said further mobile device, and to use said receiver and said transmitter to relay data received from said further mobile device to said mobile communication network, e.g. to an access point or other gateway to said mobile communication network, in dependence on said determination. Said mobile device may be connected with said gateway via a wire or wireless. Said gateway may be an access point such as an NodeB, an eNodeB, a wireless access point, a femtocell, and a picocell, which have in common that transmission of the signal happens by means of an electromagnetic wave such as a radio signal.

Said mobile device may further comprise a display and user input means, said at least one processor may be further configured to use said display to display said information and to use said user input means to receive a user response to said displayed information, said user response indicating whether said mobile device is to act as a relay for said further mobile device, and said at least one processor may be configured to determine that said mobile device is to act as a relay for said further mobile device in dependence on said user response. This allows the user of the mobile device to make a better decision on whether to relay for the further mobile device using verified information received from the mobile communication network.

Said at least one processor may be configured to determine whether said mobile device is to act as a relay for said further mobile device based on said information and on a configuration setting stored on said mobile device and/or an output of an application running on said mobile device. This allows the mobile device to make a better decision on whether to relay for the further mobile device using verified information received from the mobile communication network without requiring input from the user of the mobile device.

According to another embodiment, a method of sending information relating to a further mobile device is provided, which helps make a better decision as to whether a mobile device should relay data received from a further mobile device to a mobile communication network.

The method of sending information relating to a further mobile device comprises the steps of receiving a request for allowing a mobile device to be used by a further mobile device as a relay to a mobile communication network, determining a unique identifier of said further mobile device based on said request, obtaining information relating to said further mobile device based on said unique identifier, and sending said information to said mobile device.

According to yet another embodiment, a method of receiving information relating to a further mobile device is provided, which helps make a better decision as to whether a mobile device should relay data received from a further mobile device to a mobile communication network.

The method of receiving information relating to a further mobile device comprises the steps of receiving information from a system in a mobile communication network on a mobile device, said information identifying a further mobile device requesting to use said mobile device as a relay to said mobile communication network, determining based on at least said information whether said mobile device is to act as a relay for said further mobile device, and relaying data received from said further mobile device to said mobile communication network, e.g. to an access point or other gateway to said mobile communication network, via said mobile device in dependence on said determination.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: receiving a request for allowing a mobile device to be used by a further mobile device as a relay to a mobile communication network, determining a unique identifier of said further mobile device based on said request, determining whether said mobile device is to act as a relay for said further mobile device based on said unique identifier of said further mobile device, and notifying said mobile device that it is to act as a relay for said further mobile device in dependence on said determination.

The same or a different non-transitory computer-readable storage medium stores at least one further software code portion, the further software code portion, when executed or processed by a computer, being configured to perform executable operations comprising: receiving a notification from a system in a mobile communication network on a mobile device, said notification notifying said mobile device that it is to act as a relay to said mobile communication network for a further mobile device, and starting relaying data received from said further mobile device to said mobile communication network, e.g. to an access point or other gateway to said mobile communication network, upon receiving said notification.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
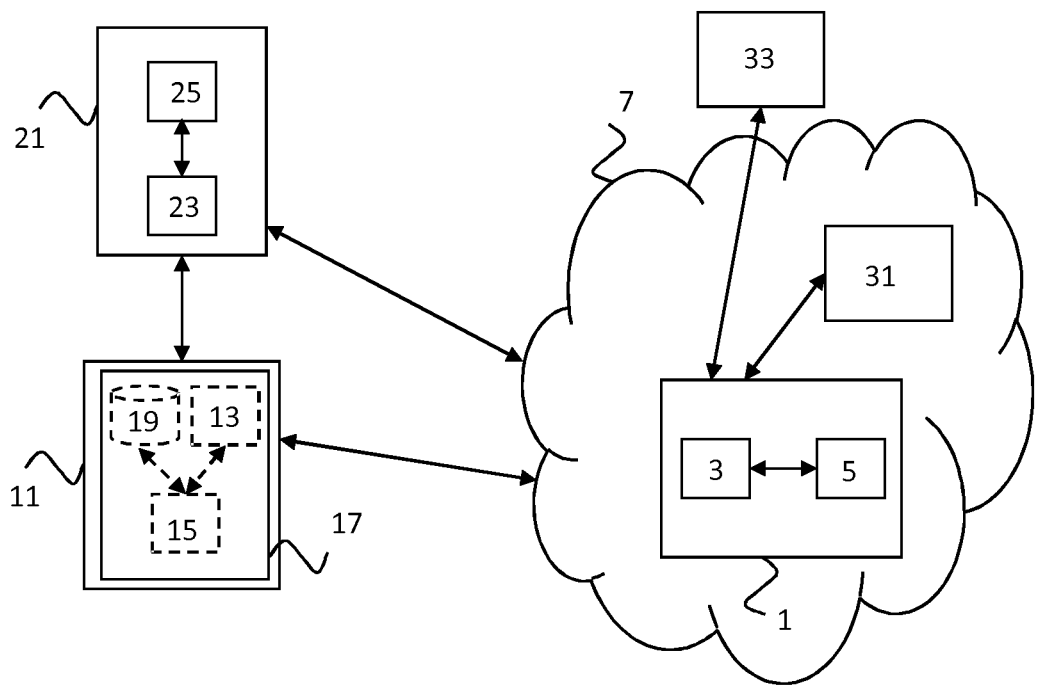
FIG. 1 is a block diagram of an embodiment of the system and mobile device of the invention.

FIG. 1 shows a mobile communication network 7 comprising a system 1, a mobile device 11 and a further mobile device 21. The system 1 comprises a transceiver 3, which comprises a receiver and a transmitter, and a processor 5. The processor 5 is configured to use the transceiver 3 to receive a request for allowing the mobile device 11 to be used by the further mobile device 21 as a relay to the mobile communication network 7 and to determine a unique identifier, e.g. a GUTI, of the further mobile device 21 based on the request. The mobile device 11 comprises a transceiver 13 and a processor 15. The mobile communication network 7 is a network controlled by a mobile network operator.

In a first embodiment of the system 1, the processor 5 is further configured to obtain information relating to the further mobile device 21 based on the unique identifier, and to use the transceiver 3 to send the information to the mobile device 11. In a first embodiment of the mobile device 11, the processor 15 is configured to use the transceiver 13 to receive the information from the system 1, to determine based on the information whether the mobile device 11 is to act as a relay for the further mobile device 21, and to use the transceiver 13 to relay data received from the further mobile device 21 to a gateway, e.g. access point, of the mobile communication network 7 in dependence on the determination. Unlike typical information provided by the further mobile device 21 to the mobile device 11, the information obtained and provided by the system 1 to the mobile device 11 has been verified. Unlike the unique identifier, the information obtained and provided by the system 1 to the mobile device 11 is meaningful to a person. The gateway may be a base station of the mobile communication network 7, for example.

In a second embodiment of the system 1, the processor 5 is further configured to determine a unique identifier of the further mobile device 21 based on the request, to determine whether the mobile device 11 is to act as a relay for the further mobile device 21 based on the unique identifier of the further mobile device 21, and to use the transceiver 3 to notify the mobile device 11 that it is to act as a relay for the further mobile device 21 in dependence on the determination. In a second embodiment of mobile device 11, the processor 15 is configured to use the receiver 13 to receive the notification from the system 1 and to use the transceiver 13 to start relaying data received from the further mobile device 21 to a gateway, e.g. access point, of the mobile communication network 7 upon receiving the notification.

In a third embodiment of the system 1, the processor 5 is configured to behave similar as in the first embodiment of the system 1 and similar as in the second embodiment of the system 1. In a third embodiment of the mobile device 11, the processor 15 is configured to behave similar as in the first embodiment of the mobile device 11 and similar as in the second embodiment of the mobile device 11.

The unique identifier may comprise a permanent identifier of the mobile device identifying the mobile device in the mobile communication network and/or a temporary identifier of the mobile device identifying the mobile device in the mobile communication network. The unique identifier may comprise an International Mobile Subscriber Identity (IMSI), a Globally Unique Temporary UE Identity (GUTI), a Proximity Services (ProSe) (obfuscated) identifier, and/or a C-RNTI. The information may comprise an e-mail address, an MSISDN, a Session Initiation Protocol Uniform Resource Identifier, a social network username or profile picture and/or an indication of an existing relation between the mobile device 11 and the further mobile device 21. The processor 5 of the system 1 may be configured to obtain the information relating to the further mobile device 21 from a database 31 in the mobile communication network 7 and/or from a trusted third party server 33. The processor 5 of the system 1 may be configured to implement a 3GPP Proximity Services Function, thereby causing the system 1 to behave as 3GPP Proximity Services Function (ProSe Function).

In the first and third embodiment of the system 1, the processor 5 may be configured to determine whether the further mobile device 21 allows the information to be sent to any mobile device, a group of devices which includes the mobile device 11 and/or the mobile device 11 specifically, and to only send the information to the mobile device 11 if allowed by the further mobile device 21.

In the first and third embodiment of the system 1, the processor 5 may be further configured to determine whether data use can be charged to the further mobile device 21 based on the unique identifier of the further mobile device 21 and to use the transceiver 3 to inform the mobile device 11 that the mobile device 11 is not charged for relaying data from the further mobile device 21 to the mobile communication network 7 if this has been determined to be the case.

In the first and third embodiment of the system 1, the processor 5 may be configured to determine a unique identifier of the mobile device 11 based on the request, to determine a relation between the mobile device 11 and the further mobile device 21 based on the unique identifier of the mobile device 11 and the unique identifier of the further mobile device 21, and to use the transceiver 3 to send information comprising an indication of the relation to the mobile device 11.

In the first and third embodiment of the system 1, the processor 5 may be further configured to determine a unique identifier of the mobile device 11 based on the request, to obtain information relating to the mobile device 11 based on the unique identifier of the mobile device 11, and to determine a relation between the mobile device 11 and the further mobile device 21 based on the information relating to the mobile device 11 and the information relating to the further mobile device 21. The processor 5 may be configured to use the transmitter 3 to send information comprising an indication of the relation to the mobile device 11.

In the first and third embodiment of the mobile device 11, the mobile device 11 may further comprise a touchscreen 17. The processor 15 may be further configured to use the touchscreen 17 to display the information and to use touch screen 17 to receive a user response to the displayed information, the user response indicating whether the mobile device 11 is to act as a relay for the further mobile device 21. The processor 15 may be configured to determine that the mobile device 11 is to act as a relay for the further mobile device 21 in dependence on the user response. In an alternative embodiment, separate display and user input components may be used instead of a touch screen. A separate user input component may comprise keys, for example.

In the first and third embodiment of the mobile device 11, the processor 15 may be configured to determine whether the mobile device 11 is to act as a relay for the further mobile device 21 based on the information and on a configuration setting stored on the mobile device 11 and/or an output of an application running on the mobile device 11. The configuration setting and/or the application and its data may be stored on storage means 19.

In the second and third embodiment of the system 1, the processor 5 may be further configured to determine a unique identifier of the mobile device 11 based on the request and to determine a relation between the mobile device 11 and the further mobile device 21 based on the unique identifier of the mobile device 11 and the unique identifier of the further mobile device 21. The processor 5 may be configured to determine whether the mobile device 11 is to act as a relay for the further mobile device 21 based on the relation.

In the second and third embodiment of the system 1, the processor 5 may be further configured to obtain information relating to the further mobile device 21 based on the unique identifier of the further mobile device 21. The processor 5 may be configured to determine whether the mobile device 11 is to act as a relay for the further mobile device 21 based on the information relating to the further mobile device 21.

In the second and third embodiment of the system 1, the processor 5 may be configured to obtain information relating to the further mobile device 21 based on the unique identifier of the further mobile device 21, to determine a unique identifier of the mobile device 11 based on the request, to obtain information relating to the mobile device 11 based on the unique identifier of the mobile device 11, to determine a relation between the mobile device 11 and the further mobile device 21 based on the information relating to the mobile device 11 and on the information relating to the further mobile device 21, and to determine whether the mobile device 11 is to act as a relay for the further mobile device 21 based on the relation.

In the second and third embodiment of the system 1, the processor 5 may be further configured to determine whether data use can be charged to the further mobile device 21 based on the unique identifier of the further mobile device 21. The processor 5 may be configured to determine whether the mobile device 11 is to act as a relay for the further mobile device 21 in dependence on whether data use can be charged to the further mobile device 21.

The mobile device 11 may be a smart phone, a laptop or a tablet, for example. The mobile device 11 may have a SIM card slot, for example. The further mobile device 21 may be, for example, a wearable device like virtual reality glasses, a smart watch, augmented reality glasses, earphones, a hearing aid, a glucose sensor, a body temperature sensor, a blood pressure sensor, an insulin pump, a heart rate sensor, a GPS sensor or an accelerometer. Alternatively, the further mobile device 21 may be, for example, a car that connects to the mobile device of the driver. The further mobile device 21 may also be a device that the user may carry, use or interact with only occasionally and is connected to his/her mobile device only occasionally, e.g. a game console, a wireless toy, a wireless keyboard, a tablet, a screen, a beamer, or a musical instrument.

In the embodiment shown in FIG. 1, the system 1 comprises one processor 5. In an alternative embodiment, the system 1 comprises multiple processors. In the embodiment shown in FIG. 1, a receiver and a transmitter are combined in the transceiver 3 of the system 1. In an alternative embodiment, the system 1 comprises a receiver and a transmitter that are separate. In the embodiment shown in FIG. 1, the mobile device 11 comprises one processor 15. In an alternative embodiment, the mobile device 11 comprises multiple processors. In the embodiment shown in FIG. 1, a receiver and a transmitter are combined in the transceiver 13 of the mobile device 11. In an alternative embodiment, the mobile device 11 comprises a receiver and a transmitter that are separate. The transceiver, the transmitter and/or the receiver may support multiple communication technologies and/or may comprise multiple hardware components.

The transceiver 3 of the system 1 may use WiFi, Ethernet or one or more cellular communication technologies such as GPRS, CDMA, UMTS and/or LTE to communicate with the mobile device 11, for example. The processor 5 is preferably a general-purpose processor, e.g. an Intel or an AMD processor. The processor 5 may comprise multiple cores, for example. The processor 5 may run a Unix-based or Windows operating system, for example. The system 1 may comprise other components typical for a component in a mobile communication network, e.g. a power supply and a random access memory.

The transceiver 13 of the mobile device 11 may use LTE Proximity Services (including LTE D2D) to communicate with the further mobile device 21, for example. Alternatively or additionally, the transceiver 13 of the mobile device 11 may use Body Area Network (BAN)/Personal Area Network (PAN) technologies such as Bluetooth (Low Energy), NFC, and ZigBee to communicate with the further mobile device 21, for example. The transceiver 13 of the mobile device 11 may use WiFi, Ethernet or one or more cellular communication technologies such as GPRS, CDMA, UMTS and/or LTE to communicate with the system 1, for example. The processor 15 may be a general-purpose processor, e.g. an ARM or a Qualcomm processor, or an application-specific processor. The storage means 19 may comprise solid state memory, for example. The mobile device 11 may comprise other components typical for a mobile device, e.g. a random access memory and a battery.

The database 31 may be a server or part of a server. This server and/or the trusted third party server 33 may be or may run on a device that comprises solid state memory, e.g. one or more Solid State Disks (SSDs) made out of Flash memory, or one or more hard disks, for example. The trusted third party server 33 may be used to host a social network, e.g. Facebook or LinkedIn. Server 33 or parts of server 33 may be hosted close to the edge of the mobile communications network, e.g. in the same building or even on the same hardware as components of the mobile communications network.

Figure 2:
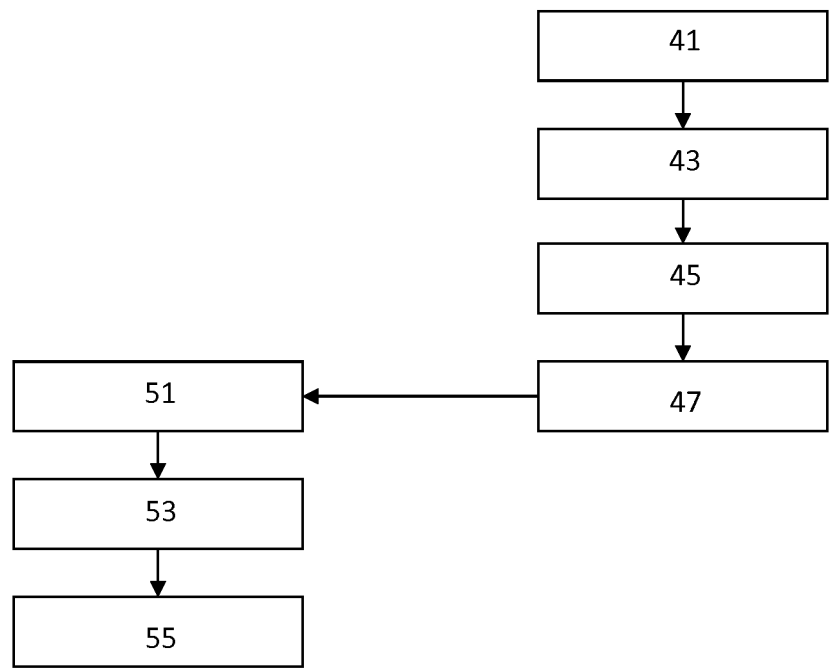
FIG. 2 is a flow diagram of the methods of sending and receiving information relating to a further mobile device of the invention.

A flow diagram of the methods of sending and receiving information relating to a further mobile device of the invention is shown in FIG. 2. A step 41 comprises a system receiving a request for allowing a mobile device to be used by a further mobile device as a relay to a mobile communication network. A step 43 comprises the system determining a unique identifier of the further mobile device based on the request. A step 45 comprises the system obtaining information relating to the further mobile device based on the unique identifier. A step 47 comprises the system sending the information to the mobile device.

A step 51 comprises the mobile device receiving the information from the system. A step 53 comprises the mobile device determining based on at least the information whether the mobile device is to act as a relay for the further mobile device. A step 55 comprises the mobile device relaying data received from the further mobile device to the mobile communication network via the mobile device in dependence on the determination.

Figure 3:
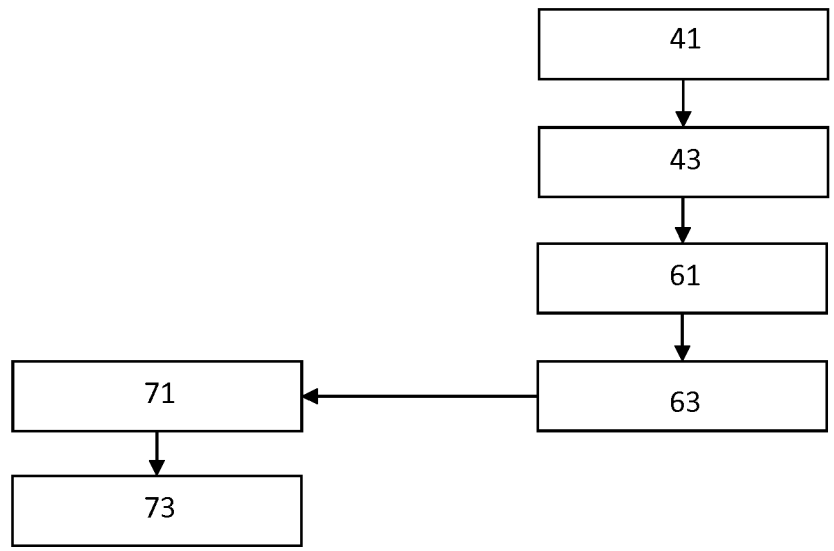
FIG. 3 is a flow diagram of the methods of sending and receiving a relay notification of the invention.

A flow diagram of the methods of sending and receiving a relay notification of the invention is shown in FIG. 3. A step 41 comprises the system receiving a request for allowing a mobile device to be used by a further mobile device as a relay to a mobile communication network. A step 43 comprises the system determining a unique identifier of the further mobile device based on the request. A step 61 comprises the system determining whether the mobile device is to act as a relay for the further mobile device based on the unique identifier of the further mobile device. A step 63 comprises the system notifying the mobile device that it is to act as a relay for the further mobile device in dependence on the determination.

A step 71 comprises the mobile device receiving the notification from the system. A step 73 comprises the mobile device starting relaying data received from the further mobile device to the mobile communication network, e.g. to an access point or other gateway to the mobile communication network, upon receiving the notification.

Figure 4:
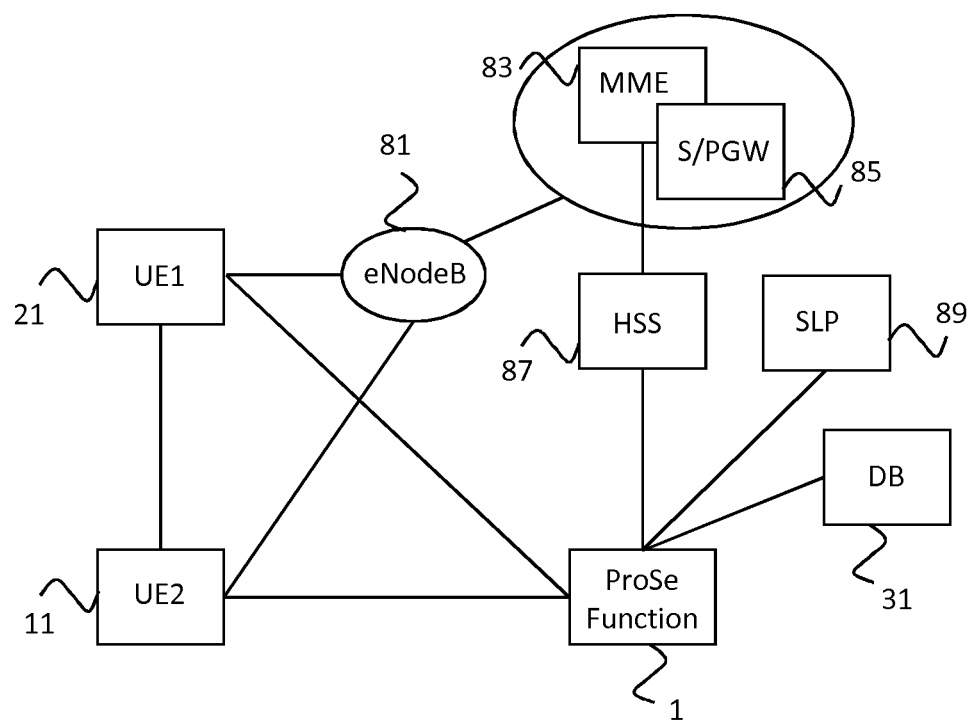
FIG. 4 is a block diagram showing an example of a Proximity Services architecture.

FIG. 4 shows an example of a Proximity Services architecture that is similar to the one depicted in section 4.2 of ETSI technical specification (TS) 123 303 v13.4.0 (2016 July) ("Universal Mobile Telecommunications System (UMTS); LTE; Proximity-based services (ProSE); Stage 2").

In FIG. 4, the system 1 behaves as a 3GPP Proximity Services Function (ProSe Function) and the mobile device 11 and the mobile device 21 behave as User Equipment. The mobile device 11 (UE2) and the further mobile device 21 (UE1) may connect wirelessly to the mobile communication network via the gateway 81 (eNodeB). The mobile device 11 (UE2) and the further mobile device 21 (UE1) may use these connections to communicate with the system 1 (ProSe Function) and with other UEs. The Mobility Management Entity 83 (MME) is responsible for initiating paging and authentication of the mobile devices. The Serving and PDN Gateway 85 (S/PGW) route and forward user data packets from UEs via gateway 81 (eNodeB) to other devices in the mobile communication network and to external packet data networks.

The system 1 (ProSe Function) may obtain subscription and/or subscriber data information from the Home Subscriber Server 87 (HSS), e.g. in order to determine whether mobile device 21 (UE2) is authorized to use Proximity Services. The Secure User Plane (SUPL) Location Platform 89 (SLP) is the Entity responsible for SUPL Service Management and Position Determination. SUPL supports various positioning technologies (e.g. A-GPS, cell-Id and EOTD). The system 1 (ProSe Function) may use the SUPL Location Platform 89 (SLP) to provide a list of UEs near the further mobile device 21, for example. The system 1 (ProSe Function) may further use the database 31 (DB), as described previously.

In the following description, the system 1 is referred to as ProSe Function, the mobile device 11 is referred to as UE2 and the further mobile device 21 is referred to as UE1.

Figure 5:
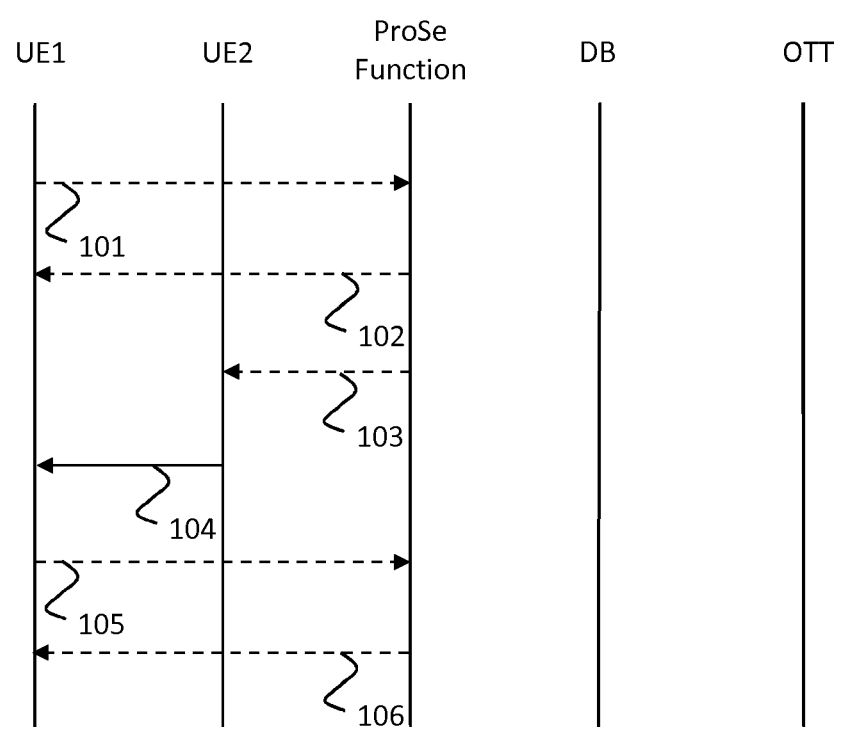
FIG. 5 is a flow diagram showing an example of a relay User Equipment (UE) discovery process implemented in a network supporting Proximity Services.

FIG. 5 is a flow diagram showing an example of the process of discovering/finding a relay node implemented in a network supporting Proximity Services (ProSe).

Both UE1 and UE2 are connected to the network using a standard attach. Both UEs have a security context and a valid subscription and both UEs are ProSe enabled, meaning that they are able to use ProSe, are authorized to use ProSe and possess key material if necessary.

In step 101, UE1 contacts the ProSe Function with a request for relaying its traffic via a (still to be found) relay node. This request may include a request to use a relay node that can offer a particular QoS class and/or a certain (minimum) datarate and/or that is owned/used by colleague from the same company and/or by a member of the same verifiable group, e.g. a Facebook friend.

The ProSe Function may then look up UE1 in a database and if UE1 is not known send a "REJECT, DEVICE UNKNOWN" message back to UE1 in step 102. If UE1 is known, the ProSe Function may send an acknowledgement back to UE1 with "ACK" (acknowledge) in step 102. Alternatively or additionally, the ProSe Function may check in the Home Subscriber Server 87 (HSS) of FIG. 4 whether UE1 is authorized to use relaying in the network that it is currently located in.

The ProSe function then requests all ProSe devices that are registered as relays in range (e.g. attached to the same eNB as UE1) in step 103 to start broadcasting (and thus announcing their presence). Relay UEs announce in their broadcast messages that they can be used as relay. Relay UEs may further broadcast how much bandwidth they want to make available for relaying to allow UEs to select a relay UE based on this information. UE1 may store identifiers of all relay UEs from which it received a broadcast in a list. In step 104, UE2 sends such a broadcast message to UE1. Based on the received broadcast message from UE2, UE1 has thus discovered UE2 as a possible relay. In case no relay nodes would have been found, UE1 might have displayed a "NO RELAY NODES FOUND" message on its display.

The discovery process may further include a message exchange with the ProSe Function where the UE1 sends a match report to the ProSe Function in step 105 and receives a reply in step 106. These steps are described in more detail in the afore-mentioned ETSI TS 123.303 and in the ETSI technical specification (TS) 133.303 V13.3.0 (2016 April) ("Universal Mobile Telecommunications System (UMTS); LTE; Proximity-based services (ProSE); Security aspects").

The discovery process may alternatively be implemented in a different manner. For example, UE1 may broadcast a message that it is looking for a relay node to which available relay nodes, e.g. UE2, respond, or UE1 may scan for relay nodes that use Bluetooth to advertise their availability.

Figure 6:
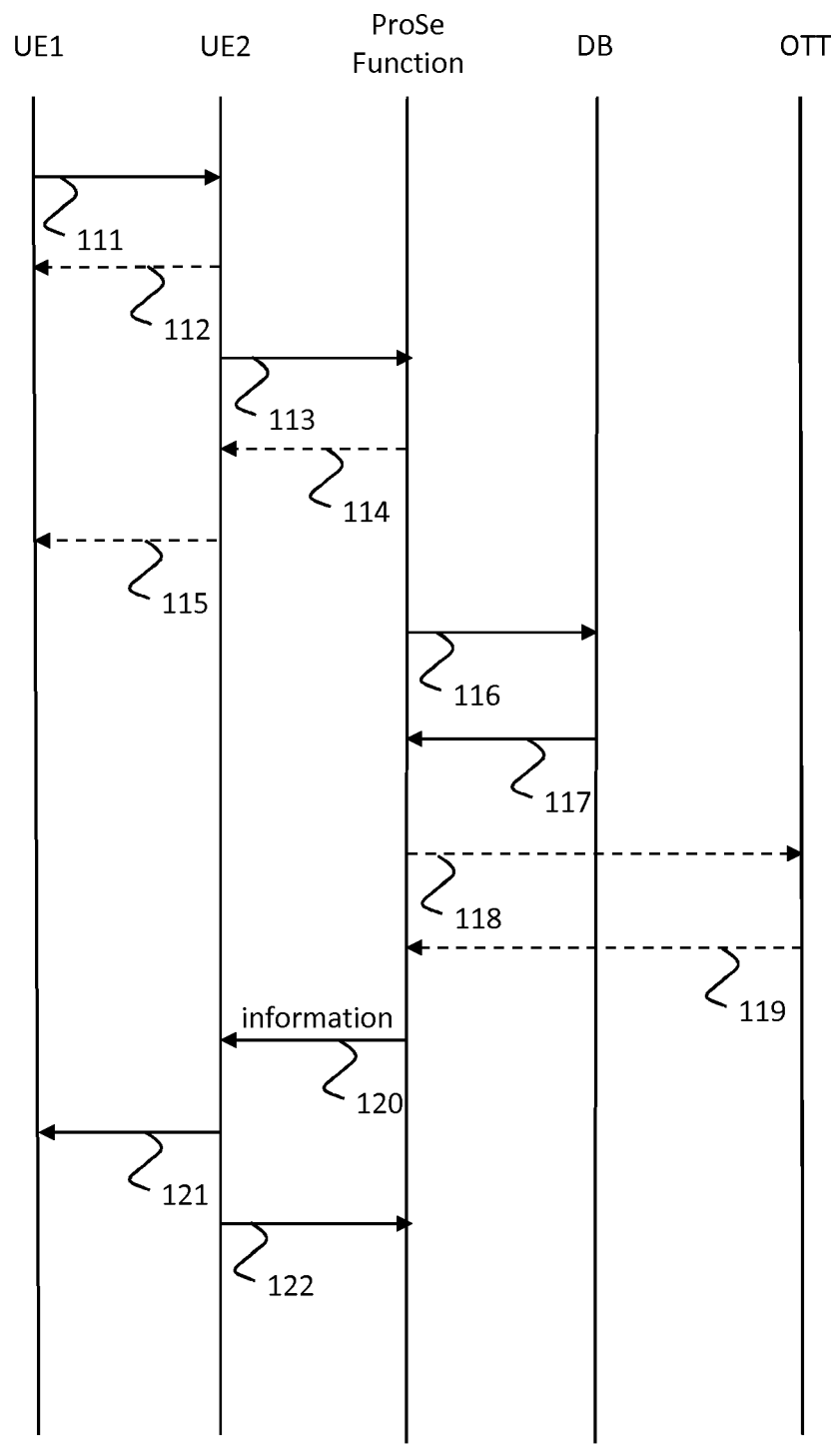
FIG. 6 is a flow diagram showing an example of the methods of FIG. 2 implemented in a network supporting Proximity Services.

FIG. 6 is a flow diagram showing an example of the methods of FIG. 2 implemented in a network supporting Proximity Services.

After UE2 has been discovered, the UE1 asks UE2 in step 111 whether it would like to act as a relay and provides an obfuscated identity, e.g. a ProSe identity (PRUK), which is obfuscated by default, or a GUTI, TMSI, IMSI or other temporary identifier. UE1 may further indicate one or more of the following:

Whether UE1 allows UE2 to obtain its identity, and if so, which identity can be obtained (e.g. Facebook, MSISDN, SIP URL, etc.) and under which conditions (e.g. always or only when UE2 belongs to a colleague or a Facebook friend or is connected to the same access point). If not, whether 'group based' identification is allowed, e.g. letting the network verify whether they are friends on social media. This indicated information may be integrity protected by UE1 in a way that the network can verify in a later step that it came from UE1. Alternatively, the network may obtain this information from a database in the network. UE1 may also indicate where its (higher-level) identity may be obtained, e.g. a domain indication or application indication.

The resources and QoS to be provided by UE2.

Based on the received message, UE2 decides whether it agrees to the conditions of UE1. In particular, if UE1 has indicated that it would not like to be identified, UE2 decides whether at that point in time it is willing to accept an anonymous relay (e.g. it can take into account other factors such as location, resources available, other relaying UEs, battery power, requested QoS, etc.). Also, if UE1 has indicated that it is fine with being identified either at the group level or individually, UE2 may decide to first find out who UE1 is or whether UE1 is in a group that UE2 would like to relay for before accepting the relay. Of course, UE2 may also decide that the requested resources are only available in case UE1 is a friend of UE2 or in case UE1 is in the address book of UE2. UE2 may further have indicated that it does not want relay data for UEs that do not want to be identified or this may have been configured in the mobile communication network, for example. If UE2 decides to reject straight away, it will signal UE1 straight away in step 112, otherwise, it moves on to step 113.

UE2 indicates to the ProSe Function in step 113 that it is willing to provide relay functionality for UE1. If this willingness is conditional, UE2 may request from the network:

A canonical/higher-level identifier of UE1 that UE2 can use to see whether UE1 is in the address book, friends list etc. UE2 indicates the preferred identifier (e.g. phone number, social media identifier, email address)

and/or an indication of whether (the owners/users of) UE1 and UE2 are friends on social media or are registered as 'friends' by the network. For example, a company could register all its UEs as 'friends' or trustworthy. Whether two UEs are friends may depend on the device (e.g. all company devices may be considered trustworthy, irrespective of the subscription) or on the subscriptions (e.g. all devices using a company subscription may be considered trustworthy) or on both. This is advantageous, for example, for companies having a Bring Your Own Device policy for smartphones, but still providing the subscription, but also for companies that provide the end-user with devices (like laptops, beamers, etc.) that may come with subscriptions from different operators.

In Step 113, UE2 may forward UE1's request verbatim to the ProSe Function to inform the network of UE1's request and to show that the request indeed came from UE1.

The ProSe Function then verifies whether UE1 is allowed to use relays by verifying the subscription profile in the Home Subscriber Server 87 (HSS) of FIG. 4 (or by asking the HSS). If the UE1 is not allowed to use relays, the ProSe Function informs UE2 in step 114 that a relay function is not allowed, which in turn informs UE1 in step 115. The ProSe Function may also check with the Policy and Charging Rules Function (PCRF) whether the requested resources and expected QoS to be provided by UE2 can be provided. For example, the profile of UE2 may define what maximal aggregated data rate is available for UE2 and the ProSe Function may determine what part of this data rate is remaining when UE2 is already using part of it. Furthermore, the owner/user of UE2 may have specified that he only wants to make a certain part of his bandwidth available for relaying. If the requested resources and/or requested QoS cannot be provided, UE2 is informed in step 114, which in turn informs UE1 in step 115.

If the UE1 is allowed to use relays and the requested resources and requested QoS are available, the ProSe Function checks whether UE1 allows itself to be identified. The ProSe Function can check this by verifying the integrity of the relayed message from UE1, by asking UE1 separately or by verifying it in a database where UE1 has registered that it allows itself to be identified. Depending on the request sent by UE2 in step 113, the ProSe Function:

may retrieve the requested canonical/higher-level identifier of UE1 from a database in steps 116 and 117. For example, the ProSe Function may query the MME 83 or the DB 31 of FIG. 4 to find a mapping between the GUTI and a phone number. The ProSe Function may also relate the GUTI, the PRUK or the canonical identifier to a social media identifier or to a company email address using the DB 31 of FIG. 4 in steps 116 and 117 or using a trusted third party server, i.e. a server of an Over-The-Top (OTT) service provider, in steps 118 and 119, and/or determines a relation between (the users/owners of) UE1 and UE2. It may do so, for example, by asking a trusted third party server of a social media network in steps 118 and 119 whether they are friends or it may query a database in the network where the user/owner of UE2 has registered its friends in steps 116 and 117, e.g. based on phone book, or where the company that owns the UE2 has registered its UEs as 'friends' or trustworthy. In this case, an ID of UE2 should also be given to the trusted third party server or database. The ProSe Function may also use the ID of UE2 to determine what information of UE1 may be provided to UE2. UE1 may want to provide its (owner's/user's) identity to some (groups of) UEs, but not to other (groups of) UEs, e.g. yes to colleagues, no to taxis.

UE2 may have informed the ProSe Function which canonical/higher-level identifier(s) and/or relation indicator(s) it wants to receive. Alternatively, this may be a configuration setting in the mobile communication network, for example. UE2 may also have specified that UE1 needs to have a certain amount of "relaying credits", which can be earned by a UE when it relays data for another UE.

The ProSe Function replies to UE2 in step 120 by providing information indicating who (the user/owner of) UE1 is or indicating a relation between (the owners/users of) UE1 and UE2. Step 120 may optionally further comprise the ProSe Function indicating whether the network allows the relay to be set up.

Based on the information received from the ProSe Function, the UE2 can decide whether to set up the relay. The UE2 may, for example, display the received canonical/higher-level identifier(s) and/or relation indicator(s) on its display and ask the user whether to allow relaying from the device to which this information pertains. If the gateway, e.g. eNodeB, of the mobile communication network can distinguish between the traffic of the UE that requests relay (also referred to as "remote UE") and the relay UE's traffic and if the network can do the charging for the remote UE and the relay UE separately, the UE2 may be informed that relaying for UE1 will not be charged to UE2. UE2 may additionally receive and display information whether data relaying will be charged to UE2.

Instead of asking a user of UE2 to accept or not accept relaying of data for UE1, this may be determined based on a configuration setting (e.g. specified by rules) or by an application running on UE2. In this case, the decision whether to relay or not may for example depend on whether the remaining battery power exceeds a certain threshold or not. The configuration setting may indicate whether the UE allows relaying in general and/or may specify a whitelist of UEs for which it is willing to relay and/or a blacklist of UEs for which it is not willing to relay.

If UE2 decides to set up the relay, it will request the resources from the network (if not provided already by the network, e.g. in the message sent by the ProSe Function in step 120) and inform the UE1 in step 121 that the relay can be set up. If UE2 decides not to set up the relay, UE2 it will inform UE1 in step 121 that a relay cannot be set up. UE1 may display a notification "UE2 cannot relay" on its display in this case. UE2 may inform the ProSe Function in step 122 whether it has accepted or denied the request to act as a relay. UE2 may inform the network in step 122 to release the resources (if they are provided by the network, e.g. in the message sent by the ProSe Function in step 120).

If UE2 denies the request to act as a relay in step 121, UE1 may send a relay request to another UE that announced its presence in step in step 104 of FIG. 5 and repeat steps 111 to 122 for this other UE.

Figure 7:
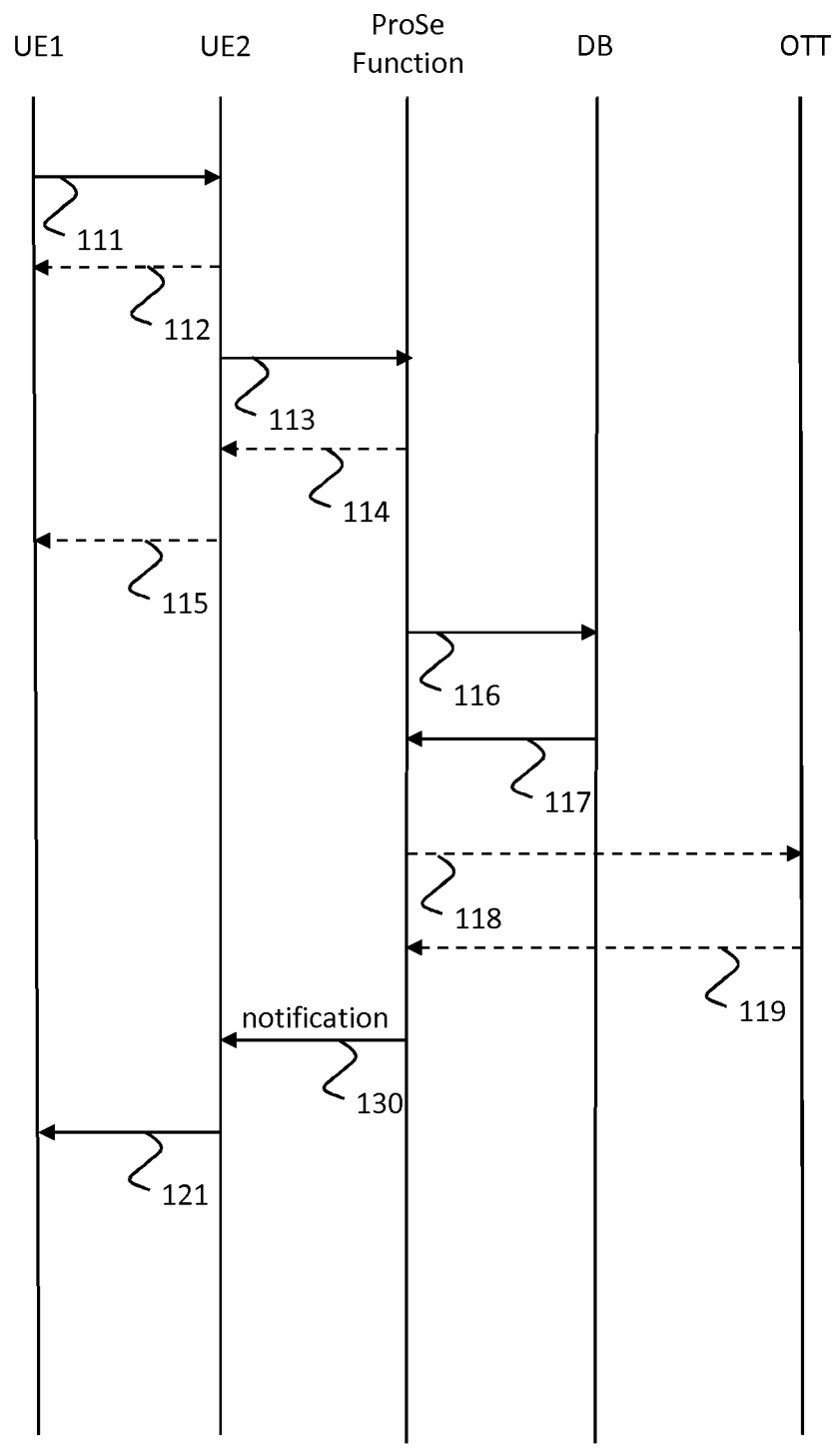
FIG. 7 is a flow diagram showing a first example of the methods of FIG. 3 implemented in a network supporting Proximity Services.

FIG. 7 is a flow diagram showing a first example of the methods of FIG. 3 implemented in a network supporting Proximity Services.

A major difference compared to FIG. 6 is that step 120 has been replaced with a step 130. In step 130, UE2 is notified whether it has to accept the relay request from UE1, i.e. UE2 does not need to take a decision itself. Rules that determine when a UE should be instructed to accept a relay request may be configured in the ProSe Function, in the database (DB) or somewhere else inside or outside the mobile communication network. These rules are protected from being modified by unauthorized users. The database (DB) may comprise or may be part of the Policy and Charging Rules Function (PCRF). The rules may specify, for example, that UE2 should relay data for UE1 if UE1 and UE2 are owned/used by members of the same verifiable group (e.g. colleagues from the same company or Facebook friends). If the rules are not satisfied, UE2 is not instructed by the ProSe Function to relay data for UE1 or UE2 is instructed by the ProSe Function not to relay data for UE1.

Furthermore, step 122 of FIG. 6 is omitted in FIG. 7, because UE2 needs to accept the relay request when notified to do so by the ProSe Function and therefore does not need to inform the ProSe Function whether it has accepted or denied the relay request.

Figure 8:
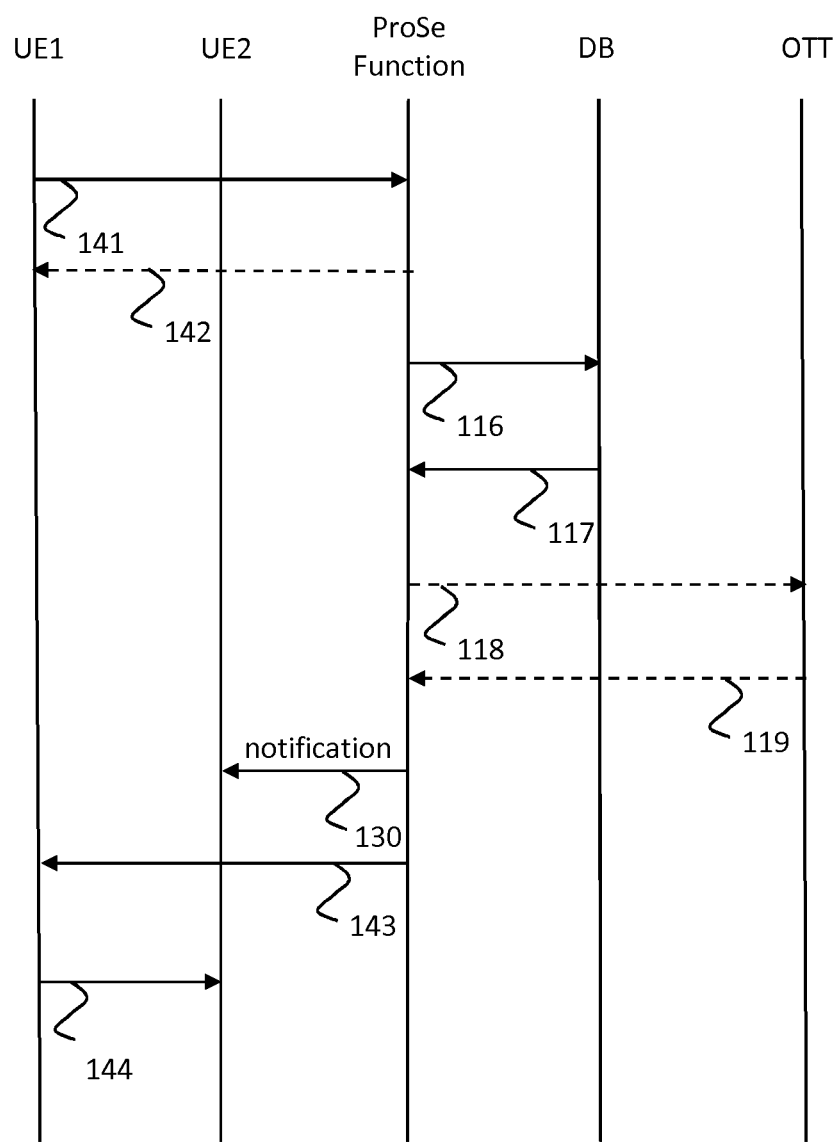
FIG. 8 is a flow diagram showing a second example of the methods of FIG. 3 implemented in a network supporting Proximity Services.

FIG. 8 is a flow diagram showing a second example of the methods of FIG. 3 implemented in a network supporting Proximity Services. The second example of FIG. 8 differs from the first example of FIG. 7 with regard to three aspects.

As a first difference, UE1 does not send a relay request to UE2, but to the ProSe Function, see step 141. UE1 includes a list of UEs in its request, e.g. a list of UEs that announced its presence in step 104 of FIG. 5. The ProSe Function then verifies whether UE1 is allowed to use relays by verifying the subscription profile in Home Subscriber Server 87 (HSS) of FIG. 4 (or by asking the HSS). If the UE1 is not allowed to use relays, the ProSe Function informs UE1 in step 142 that a relay function is not allowed.

Steps 116-119 of FIG. 8 are similar to the steps with the same reference numeral of FIGS. 6 and 7. However, if applying the rules results in the determination that UE2 does not need to relay for UE1, steps 116 and 117 and/or steps 118 and 119 may be repeated for another UE until all UEs provided by UE1 have been checked. Alternatively, steps 116-119 may include obtaining information for multiple UEs (e.g. UE2, UE3, etc.) at the same time. When an UE has been found that needs to relay for UE1, this UE is notified. In step 130, the ProSe Function notifies UE2 that it needs to relay for UE1 and sends UE2 the information needed to set up a relaying connecting for UE1.

As a third difference, the ProSe Function informs UE1 directly (instead of having UE2 inform UE1) in step 143 whether its request to use UE2 as a relay has been accepted or denied and sends UE1 the information needed to set up a relaying connection via UE2. If UE1 is informed that its request has been accepted, UE1 will send a relay request to UE2 in step 144. UE2 will accept this request, because it has been notified in step 130 to do so.

Figure 9:
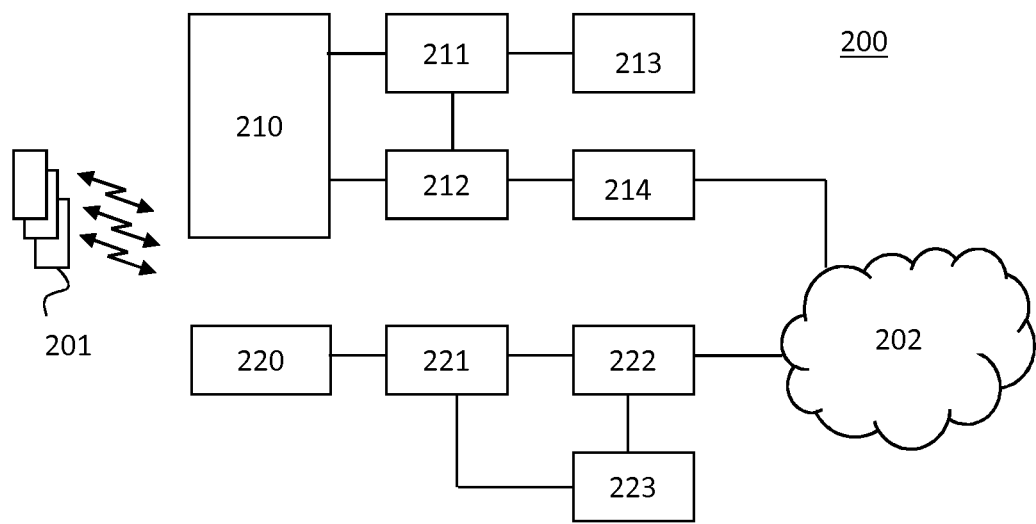
FIG. 9 is a block diagram of an exemplary cellular telecommunication system used in an embodiment of the system of the invention.

In the telecommunications system 200 of FIG. 9, three generations of networks are schematically depicted together for purposes of brevity. A more detailed description of the architecture and overview can be found in 3GPP Technical Specification TS 23.002 'Network Architecture' which is included in the present application by reference in its entirety. Other types of cellular telecommunication system can alternatively or additionally be used, e.g. a 5G cellular telecommunication system.

The lower branch of FIG. 9 represents a GSM/GPRS or UMTS network.

For a GSM/GPRS network, a radio access network (RAN) system 220 comprises a plurality of nodes, including base stations (combination of a BSC and a BTS), not shown individually in FIG. 9. The core network system comprises a Gateway GPRS Support Node 222 (GGSN), a Serving GPRS Support Node 221 (SGSN, for GPRS) or Mobile Switching Centre (MSC, for GSM, not shown in FIG. 9) and a Home Location Register 223 (HLR). The HLR 223 contains subscription information for user devices 201, e.g. mobile stations MS.

For a UMTS radio access network (UTRAN), the radio access network system 220 also comprises a Radio Network Controller (RNC) connected to a plurality of base stations (NodeBs), also not shown individually in FIG. 9. In the core network system, the GGSN 222 and the SGSN 221/MSC are connected to the HLR 223 that contains subscription information of the user devices 201, e.g. user equipment UE.

The upper branch of the telecommunications system in FIG. 9 represents a next generation network, commonly indicated as Long Term Evolution (LTE) system or Evolved Packet System (EPS).

The radio access network system 210 (E-UTRAN), comprises base stations (evolved NodeBs, eNodeBs or eNBs), not shown individually in FIG. 9, providing cellular wireless access for a user device 201, e.g. user equipment UE. The core network system comprises a PDN Gateway (P-GW) 214 and a Serving Gateway 212 (S-GW). The E-UTRAN 210 of the EPS is connected to the S-GW 212 via a packet network. The S-GW 212 is connected to a Home Subscriber Server HSS 213 and a Mobility Management Entity MME 211 for signaling purposes. The HSS 213 includes a subscription profile repository SPR for user devices 201.

For GPRS, UMTS and LTE systems, the core network system is generally connected to a further packet network 202, e.g. the Internet.

Further information of the general architecture of an EPS network can be found in 3GPP Technical Specification TS 23.401 'GPRS enhancements for Evolved Universal Terrestrial Radio Access Network (E-UTRAN) access'.

Figure 10:
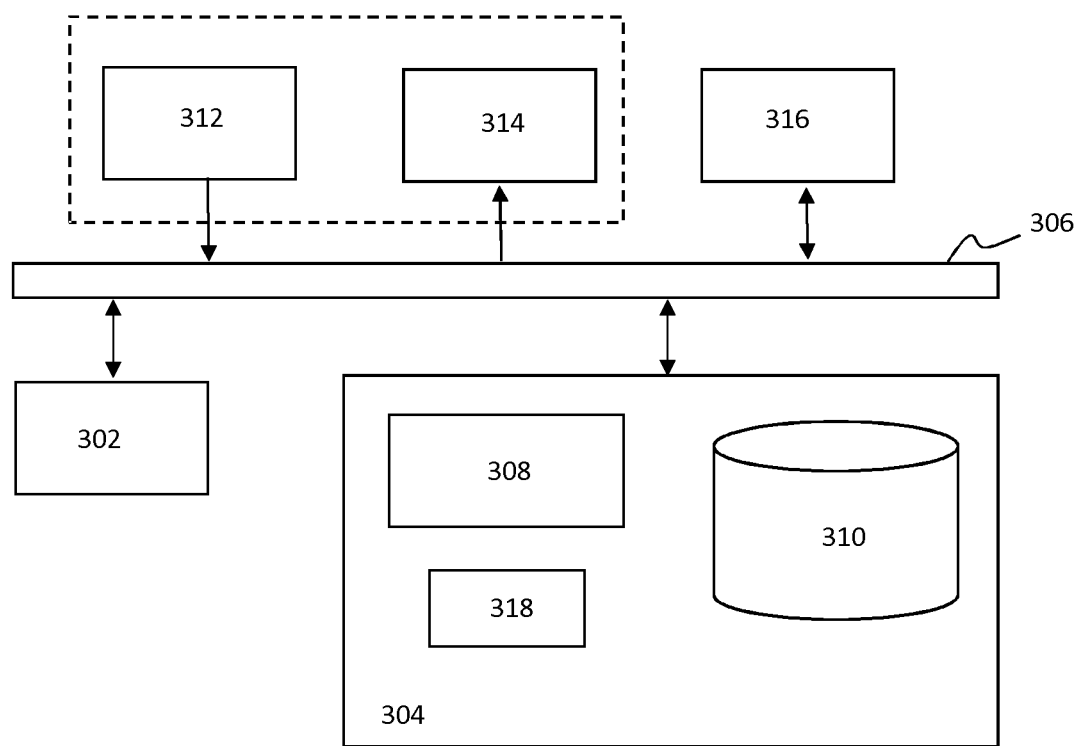
FIG. 10 is a block diagram of an exemplary data processing system for performing the methods of the invention.

FIG. 10 depicts a block diagram illustrating an exemplary data processing system that may perform the methods as described with reference to FIGS. 2 and 3 and FIGS. 5 to 8.

As shown in FIG. 10, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the number of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 10 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 10, the memory elements 304 may store an application 318. In various embodiments, the application 318 may be stored in the local memory 308, he one or more bulk storage devices 310, or separate from the local memory and the bulk storage devices. It should be appreciated that the data processing system 300 may further execute an operating system (not shown in FIG. 9) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for sending a relay notification, the system comprising:
   a receiver;
   a transmitter; and
   at least one processor configured to use said receiver to receive a request for allowing a mobile device that has attached to a mobile communication network to be used as a relay to the mobile communication network by a further mobile device that is also attached to the mobile communication network, to determine a unique identifier of said further mobile device based on said request, to determine a unique identifier of said mobile device based on said request; to determine a relation between said mobile device and said further mobile device based on said unique identifier of said mobile device and said unique identifier of said further mobile device, and to determine whether said mobile device is to act as a relay for said further mobile device based on said relation, and to use said transmitter to notify said mobile device to act as a relay for said further mobile device in dependence on said determination.

2. The system of claim 1, wherein said unique identifier comprises a permanent identifier of said mobile device identifying said mobile device in said mobile communication network and/or a temporary identifier of said mobile device identifying said mobile device in said mobile communication network.

3. The system of claim 2, wherein said unique identifier comprises an International Mobile Subscriber Identity, a Globally Unique Temporary User Equipment (UE) Identity, a Proximity Services identifier, and/or a Cell Radio Network Temporary Identifier (C-RNTI).

4. The system of claim 1, wherein said at least one processor is further configured:
   to obtain information relating to said further mobile device based on said unique identifier of said further mobile device; and
   to determine whether said mobile device is to act as a relay for said further mobile device based on said information relating to said further mobile device.

5. The system of claim 4, wherein said at least one processor is further configured to obtain said information from a database in said mobile communication network and/or from a trusted third party server.

6. The system of claim 1, wherein said at least one processor is further configured:
   to obtain information relating to said further mobile device based on said unique identifier of said further mobile device;
   to determine a unique identifier of said mobile device based on said request;

to obtain information relating to said mobile device based on said unique identifier of said mobile device;

to determine a relation between said mobile device and said further mobile device based on said information relating to said mobile device and on said information relating to said further mobile device; and to determine whether said mobile device is to act as a relay for said further mobile device based on said relation.

7. The system of claim 1, wherein said at least one processor is further configured:

to determine whether data use can be charged to said further mobile device based on said unique identifier of said further mobile device and to determine whether said mobile device is to act as a relay for said further mobile device in dependence on whether data use can be charged to said further mobile device.

8. The system of claim 1, wherein said at least one processor is further configured to implement a Third Generation Partnership Project (3GPP) Proximity Services Function.

9. A mobile device that is attached to a mobile communication network, the mobile device comprising:

a receiver;

a transmitter; and at least one processor configured to use said receiver to receive a notification from a system, said notification notifying said mobile device to act as a relay to said mobile communication network comprising said system for a further mobile device that is also attached to said mobile communication network, and to use said receiver and said transmitter to start relaying data received from said further mobile device to said mobile communication network upon receiving said notification.

10. The mobile device of claim 9, wherein said at least one processor is further configured to receive said identifier notification from a system that comprises:

a receiver;

a transmitter; and at least one processor configured to use said receiver to receive a request for allowing said mobile device to be used by a further mobile device as a relay to a mobile communication network, to determine a unique identifier of said further mobile device based on said request, to determine a unique identifier of said mobile device based on said request; to determine a relation between said mobile device and said further mobile device based on said unique identifier of said mobile device and said unique identifier of said further mobile device, and to determine whether said mobile device is to act as a relay for said further mobile device based on said relation, and to use said transmitter to notify said mobile device to act as a relay for said further mobile device in dependence on said determination.

11. A method of sending a relay notification, the method comprising:

receiving a request for allowing a mobile device that has attached to a mobile communication network to be used as a relay to the mobile communication network by a further mobile device that is also attached to the mobile communication network;

determining a unique identifier of said further mobile device based on said request;

determining a unique identifier of said mobile device based on said request;

determining a relation between said mobile device and said further mobile device based on said unique identifier of said mobile device and said unique identifier of said further mobile device;

determining whether said mobile device is to act as a relay for said further mobile device based on said relation; and notifying said mobile device to act as a relay for said further mobile device in dependence on said determination.

12. A method of receiving a relay notification, the method comprising:

receiving a notification from a system in a mobile communication network on a mobile device that has attached to said mobile communication network, said notification notifying said mobile device to act as a relay to said mobile communication network for a further mobile device that has also attached to said mobile communication network; and starting relaying data received from said further mobile device to said mobile communication network upon receiving said notification.

13. A non-transitory computer medium having stored thereon one or more computer programs comprising at least one software code portion that, when run on a computer system, causes the computer system to carry out operations including:

receiving a request for allowing a mobile device that has attached to a mobile communication network to be used as a relay to the mobile communication network by a further mobile device that is also attached to the mobile communication network;

determining a unique identifier of said further mobile device based on said request;

determining a unique identifier of said mobile device based on said request;

determining a relation between said mobile device and said further mobile device based on said unique identifier of said mobile device and said unique identifier of said further mobile device;

determining whether said mobile device is to act as a relay for said further mobile device based on said relation; and notifying said mobile device to act as a relay for said further mobile device in dependence on said determination.

14. A non-transitory computer medium having stored thereon one or more computer programs comprising at least one software code portion that, when run on a computer system, causes the computer system to carry out operations including:

receiving a notification from a system in a mobile communication network on a mobile device that has attached to said mobile communication network, said notification notifying said mobile device to act as a relay to said mobile communication network for a further mobile device that has also attached to said mobile communication network; and starting relaying data received from said further mobile device to said mobile communication network upon receiving said notification.

* * * * *